(12) United States Patent
Collins et al.

(10) Patent No.: US 8,608,979 B2
(45) Date of Patent: *Dec. 17, 2013

(54) LUMINESCENT PARTICLES, METHODS AND LIGHT EMITTING DEVICES INCLUDING THE SAME

(75) Inventors: Brian Thomas Collins, Holly Springs, NC (US); Jesse Colin Reiherzer, Wake Forest, NC (US); Florin A. Tudorica, Durham, NC (US)

(73) Assignee: Cree, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,719

(22) Filed: Sep. 12, 2012

(65) Prior Publication Data

US 2013/0001470 A1 Jan. 3, 2013

Related U.S. Application Data

(63) Continuation of application No. 12/466,782, filed on May 15, 2009, now Pat. No. 8,287,759.

(51) Int. Cl.
*C09K 11/08* (2006.01)

(52) U.S. Cl.
USPC ................ 252/301.4 F; 428/403; 428/404

(58) Field of Classification Search
USPC ........................... 252/301.4 F; 428/403, 404
See application file for complete search history.

(56) References Cited

U.S. PATENT DOCUMENTS

| 5,268,614 | A | 12/1993 | Labib et al. | 313/486 |
| 8,125,139 | B2 | 2/2012 | Emoto et al. | 313/503 |
| 8,287,759 | B2 * | 10/2012 | Collins et al. | 252/301.4 R |
| 2004/0124758 | A1 | 7/2004 | Danielson et al. | 313/486 |
| 2005/0231953 | A1 | 10/2005 | Reeh et al. | 362/260 |
| 2006/0001352 | A1 | 1/2006 | Maruta et al. | 313/486 |
| 2006/0263627 | A1 | 11/2006 | Grampeix | 428/690 |
| 2007/0007494 | A1 * | 1/2007 | Hirosaki et al. | 252/301.4 R |
| 2007/0278935 | A1 * | 12/2007 | Harada | 313/503 |
| 2009/0046453 | A1 | 2/2009 | Kramer | 362/231 |
| 2009/0072708 | A1 | 3/2009 | Tamaki et al. | 313/503 |

FOREIGN PATENT DOCUMENTS

| DE | 3933679 A1 | 5/1991 | |
| JP | 2006-265506 | 10/2006 | C09K 11/64 |
| WO | WO 2005/116163 | 12/2005 | C09K 11/79 |

OTHER PUBLICATIONS

International Search Report Application and Written Opinion for International PCT No. PCT/US2010/034835, mailing date Aug. 26, 2010, pp. 1-13.

International Search Report Application and Written Opinion for International PCT No. PCT/US2010/55901, mailing date Jan. 12, 2011, pp. 1-11.

Thomas, T. et al., "Photoluminescence Enhancement in Eu Doped GaN Powder by Oxidative Passivation of the Surface,"Materials Research Society Symposium Proceedings, 1111 (2009) pp. 1-6.

* cited by examiner

*Primary Examiner* — Carol M Koslow
(74) *Attorney, Agent, or Firm* — Brinks Gilson & Lione

(57) ABSTRACT

A luminescent particle includes an interior portion of the luminescent particle comprising a luminescent compound that reacts with atmospherically present components and a passivating layer on an outer surface of the luminescent particle that is operable to inhibit the reaction between the luminescent compound and the atmospherically present components.

20 Claims, 6 Drawing Sheets

LUMINESCENT PARTICLES, METHODS AND LIGHT EMITTING DEVICES INCLUDING THE SAME

CROSS-REFERENCE TO RELATED APPLICATIONS

The present patent document is a continuation of U.S. patent application Ser. No. 12/466,782, now U.S. Pat. No. 8,287,759, which was filed on May 15, 2009 and is hereby incorporated by reference in its entirety.

TECHNICAL FIELD

The present disclosure relates to luminescent particles and light emitting devices including the same. More particularly, the present disclosure relates to luminescent particles that may be useful in light emitting devices.

BACKGROUND

Light emitting diodes and laser diodes are well known solid state lighting elements capable of generating light upon application of a sufficient voltage. Light emitting diodes and laser diodes may be generally referred to as light emitting diodes ("LEDs"). LEDs generally include a p-n junction formed in an epitaxial layer grown on a substrate such as sapphire, silicon, silicon carbide, gallium arsenide and the like. The wavelength distribution of the light generated by the LED generally depends on the material from which the p-n junction is fabricated and the structure of the thin epitaxial layers that make up the active region of the device.

LEDs may be used in devices to provide, for example, display backlighting. LEDs may also be used in lighting/illumination applications, for example, as a replacement for conventional incandescent and/or fluorescent lighting. In some lighting applications, it may be desirable to provide a lighting source that generates light having specific properties. For example, it may be desirable to provide a lighting source that generates white light having a relatively high color rendering index (CRI) so that objects illuminated by the lighting may appear more natural. The color rendering index of a light source is an objective measure of the ability of the light generated by the source to accurately illuminate a broad range of colors. The color rendering index ranges from essentially zero for monochromatic sources to nearly 100 for incandescent sources.

In addition, the chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the color or hue of the white light source. White light typically has a CCT of between about 4000 and 8000K. White light with a CCT of 4000 has a yellowish color. White light with a CCT of 8000K is more bluish in color, and may be referred to as "cool white". "Warm white" may be used to describe white light with a CCT of between about 2500K and 3500K, which is more reddish in color.

In order to produce white light, multiple LEDs emitting light of different colors of light may be used. The light emitted by the LEDs may be combined to produce a desired intensity and/or color of white light. For example, when red-, green- and blue-emitting LEDs are energized simultaneously, the resulting combined light may appear white, or nearly white, depending on the relative intensities of the component red, green and blue sources. However, in LED lamps including red, green, and blue LEDs, the spectral power distributions of the component LEDs may be relatively narrow (e.g., about 10-30 nm full width at half maximum (FWHM)). While it may be possible to achieve fairly high luminous efficacy and/or color rendering with such lamps, wavelength ranges may exist in which it may be difficult to obtain high efficiency (e.g., approximately 550 nm).

In addition, the light from a single-color LED may be converted to white light by surrounding the LED with a wavelength conversion material, such as a luminescent material. Some examples of luminescent materials may include, for example, materials described as phosphors and may include phosphor particles. A phosphor particle may refer to any material that absorbs light at one wavelength and re-emits light at a different wavelength, regardless of the delay between absorption and re-emission and regardless of the wavelengths involved. Accordingly, the term "phosphor" may be used herein to refer to materials that are sometimes called fluorescent and/or phosphorescent. In general, phosphors may absorb light having first wavelengths and re-emit light having second wavelengths that are different from the first wavelengths. For example, down conversion phosphors may absorb light having shorter wavelengths and re-emit light having longer wavelengths. As such, some or all of the light emitted by the LED at a first wavelength may be absorbed by the phosphor particles, which may responsively emit light at a second wavelength.

In some environments, luminescent particles may be susceptible to degradation resulting from a reaction in that environment. Such degradation may result in performance changes including, for example, a change in the emitted color over time.

SUMMARY

Some embodiments of the present invention include methods of providing a luminescent particle. Such methods may include providing a luminescent particle and heating the luminescent particle to provide stabilization. In some embodiments, forming a luminescent particle includes forming a luminescent nitride particle.

In some embodiments, heating the luminescent particle to provide stabilization includes reacting the luminescent particle in a heated liquid medium to reduce a reactive characteristic of an outer surface of the luminescent particle. Some embodiments provide that reacting the luminescent particle in a heated liquid medium to reduce a reactive characteristic of an outer surface of the luminescent particle comprises forming a passivating region on the outer surface of the luminescent particle. Some embodiments provide that the passivating region includes a greater percentage of oxygen than an interior portion of the luminescent particle.

In some embodiments, reacting the luminescent particle in a heated liquid medium to reduce a reactive characteristic of an outer surface of the luminescent particle includes reducing a concentration of at least one material from the outer surface of the luminescent particle. Some embodiments provide that reducing a concentration of the at least one material comprises removing a portion of nitrogen from the outer surface of the luminescent particle. In some embodiments, reacting the luminescent particle in a heated liquid medium to reduce a reactive characteristic of an outer surface of the luminescent particle includes increasing a percentage of oxygen in the outer surface and decreasing a percentage of nitrogen in the outer surface.

Some embodiments provide that reacting the luminescent particle in a heated liquid medium to reduce a reactive characteristic of an outer surface of the luminescent particle includes boiling the luminescent particle in water. In some embodiments, reacting the luminescent particle in a heated liquid medium to reduce a reactive characteristic of an outer surface of the luminescent particle includes boiling the luminescent particle a nitric acid solution. Some embodiments provide that the nitric acid solution includes a concentration of less than about 0.1 moles/Liter.

In some embodiments, the liquid medium is an aqueous solution and reacting the luminescent particle includes heating the liquid aqueous solution to maintain a heated temperature substantially at a boiling point of the aqueous solution.

Some embodiments provide that the luminescent particle includes a phosphor composition that down-converts photons in the blue and ultraviolet portions of the visible spectrum into photons in the longer wavelength portions of the visible spectrum. In some embodiments, the luminescent particle includes a phosphor composition that absorbs in the blue portion of the visible spectrum and emits in the red portion of the visible spectrum. Some embodiments provide that forming the luminescent particle includes forming the luminescent particle at a temperature in a range from about 1500 degrees Centigrade to about 1850 degrees Centigrade.

In some embodiments, the luminescent particle includes a phosphor formed from a host compound and at least one activator, the host compound includes $Ca_{1-x}Sr_xAlSiN_3$, $Ca_2Si_5N_8$, $Sr_2Si_5N_8$, $Ba_2Si_5N_8$, $BaSi_7N_{10}$, $BaYSi_4N_7$, $Y_5(SiO_4)_3N$, $Y_4Si_2O_7N_2$, $YSiO_2N$, $Y_2Si_3O_3N_4$, $Y_2Si_{3-x}Al_xO_{3+x}N_{4-x}$, $Ca_{1.5}Si_9Al_3N_{16}$, $Y_{0.5}Si_9Al_3O_{1.5}N_{14.5}$, $CaSiN_2$, $Y_2Si_4N_6C$, and/or $Y_6Si_{11}N_{20}O$, and the at least one activator includes Ce, Eu, Sm, Yb, Gd and/or Tb, where $0 \leq x < 1$.

Some embodiments of the present invention include a luminescent particle that includes a luminescent compound and a passivating region proximate an outer surface of the luminescent particle that is operable to inhibit reactions involving the luminescent compound. In some embodiments, the luminescent particle includes a stabilized luminescent nitride particle and the luminescent compound includes a luminescent nitride compound.

Some embodiments provide that the passivating region includes an oxide that is formed during exposure of a luminescent compound particle to a liquid medium that is heated to a threshold temperature. Some embodiments further include an interior portion of the luminescent particle including the luminescent compound. Some embodiments provide that the passivating region includes a greater percentage of oxygen than an interior portion of the luminescent particle. Some embodiments include an interior portion of the luminescent particle including the luminescent compound and may provide that the passivating region includes a reduced percentage of nitrogen than an interior portion of the luminescent particle.

In some embodiments, the passivating region is formed during exposure of a luminescent compound particle to a liquid medium that is heated to a threshold temperature. Some embodiments provide that the liquid medium includes an aqueous solution and the threshold temperature includes a boiling point of the aqueous solution.

Some embodiments provide that the passivating region is formed during exposure of a luminescent compound particle to a liquid medium that is heated to a threshold temperature and that the liquid medium includes water. In some embodiments, the passivating region is formed during exposure of a luminescent compound particle to a liquid medium that is heated to a threshold temperature. Some embodiments provide that the liquid medium includes an acid solution.

In some embodiments, the luminescent particle includes a luminescent nitride particle, the passivating region includes a reduced percentage of nitrogen layer that is formed during exposure of the luminescent particle to the liquid medium that is heated to a threshold temperature, and the reduced percentage of nitrogen layer results from the transition of a portion of surface material of the luminescent particle from the luminescent particle via the liquid medium.

Some embodiments provide that the luminescent compound includes a phosphor formed from a host compound and at least one activator. In some embodiments, the host compound includes $Ca_{1-x}Sr_xAlSiN_3$, $Ca_2Si_5N_8$, $Sr_2Si_5N_8$, $Ba_2Si_5N_8$, $BaSi_7N_{10}$, $BaYSi_4N_7$, $Y_5(SiO_4)_3N$, $Y_4Si_2O_7N_2$, $YSiO_2N$, $Y_2Si_3O_3N_4$, $Ca_{1.5}Si_9Al_3N_{16}$, $Y_{0.5}Si_9Al_3O_{1.5}N_{14.5}$, $CaSiN_2$, $Y_2Si_4N_6C$, and/or $Y_6Si_{11}N_{20}O$, and the at least one activator includes Ce, Eu, Sm, Yb, Gd and/or Tb, where $0 \leq x < 1$.

In some embodiments, the luminescent compound reacts with atmospherically present water vapor and a reaction produces at least one resultant gas. Some embodiments provide that a photon down converting performance of the luminescent compound is substantially preserved in the luminescent particle. Some embodiments provide that the photon down converting performance includes at least one of a radiant flux and/or a wavelength of the photons in the longer wavelength portions of the visible spectrum.

In some embodiments, the luminescent compound includes $Ca_{1-x}Sr_xEu_yAlSiN_3$. Some embodiments provide that the luminescent compound includes a phosphor including $Y_3Al_5O_{12}$ (YAG:Ce), $CaAlSiN_3$ or $Ca_{1-x}Sr_xAlSiN_3$ (CASN or SCASN), SiAlON, $Sr_3SiO_5$, $Tb_3Al_5O_{12}$ (TAG:Ce), doped strontium thio-gallate, doped $Sr_2Si_5N_8$, $Y_2O_2S$, $La_2O_2S$, silicon garnet, $Y_2O_2S$ and/or $La_2O_3$, where $0 \leq x < 1$.

Some embodiments of the present invention include a light emitting device that includes a luminescent particle as described herein and a light emitting source. In some embodiments, the luminescent particle is dispersed within a silicone encapsulant. Some embodiments provide that the light emitting source emits radiation with a maximum emission at a wavelength in a range of about 380 to about 470 nm and the luminescent particle absorbs at least some of the light emitted from the light emitting source and emits light having a maximum emission at a wavelength in a range of about 500 to about 700 nm.

Some embodiments of the present invention include methods of providing a reacted luminescent particle. Embodiments of such methods may include providing a luminescent particle that reacts with a first compound and reacting the luminescent particle in a medium to reduce a reactive characteristic of an outer surface of the luminescent particle. In some embodiments, reacting the luminescent particle in a medium to reduce a reactive characteristic of an outer surface of the luminescent particle includes forming a passivating region on the outer surface of the luminescent particle. Some embodiments provide that the passivating region includes a greater percentage of the first component than an interior portion of the luminescent particle. In some embodiments, reacting the luminescent particle in a medium to reduce a reactive characteristic of an outer surface of the luminescent particle includes reducing a concentration of at least one material from the outer surface of the luminescent particle. In some embodiments, the medium includes an aqueous solution and reacting the luminescent particle includes heating the liquid aqueous solution to maintain a heated temperature substantially at a boiling point of the aqueous solution.

Some embodiments of the present invention include a luminescent particle. In some embodiments, the luminescent particle includes a luminescent compound that reacts with a first component and an outer surface including a higher concentration of the first component.

DETAILED DESCRIPTION

Figure 1:
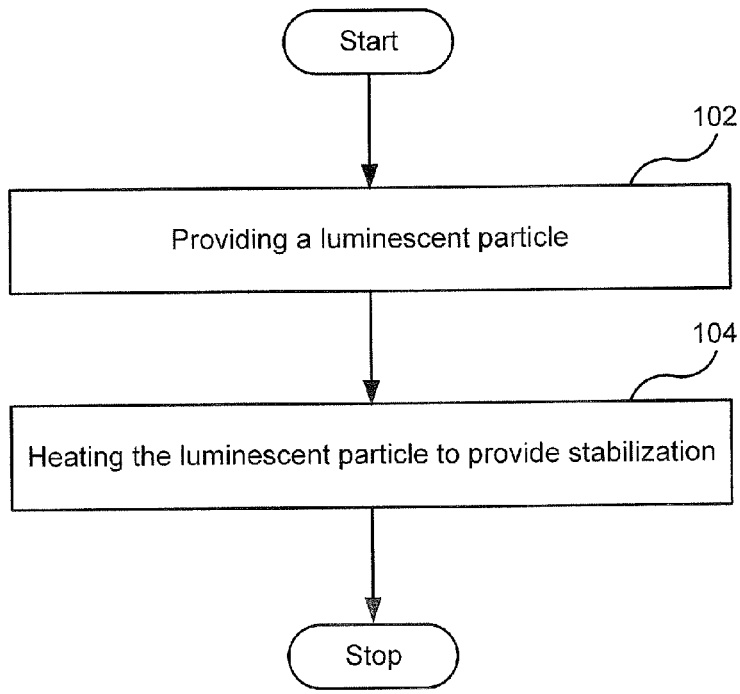
FIG. 1 is a flow diagram illustrating methods of providing a luminescent particle according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers refer to like elements throughout the specification.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. Accordingly, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

According to some embodiments of the present invention, luminescent particles provided may include luminescent nitride particles and may be useful as phosphors. The term "luminescent particle" is used herein to describe phosphor particles made from host materials including nitrides, oxynitrides, sulfides, selenides, halides and/or silicates of zinc, cadmium, manganese, aluminum, silicon, and/or various rare earth metals. For example, phosphors may include Ce-doped YAG (YAG:$Ce^{3+}$, or $Y_3Al_5O_{12}$:$Ce^{3+}$), barium orthosilicate, and/or TAG:Ce among others. The term "luminescent nitride particle" is used herein to describe particles including phosphors for which the anion is predominantly nitride and in which the amount of oxygen present in the crystal structure is so minimal as to avoid changing the crystal structure from that fundamentally formed by the nitride.

Although it is recognized that there is no bright line or exact boundary that defines the amount of oxygen present that causes the composition to be categorized as a nitride, generally speaking only small amounts of oxygen may be present. Specifically, some embodiments of the present invention provide stabilized phosphor materials that may be useful in warm white solid state light emitting devices.

For example, it is known that a single blue emitting LED may be used in combination with a yellow phosphor, and that the combination of blue light and yellow light may appear white to an observer. Red-emitting phosphor particles may also be added to improve the color rendering properties of the light, i.e., to make the light appear more "warm." As described in pending U.S. patent application Ser. No. 12/271,945, which is incorporated by reference in its entirety, some compounds may be useful as phosphors that may produce warm white light when used in an LED that includes a blue emitting solid state die.

Luminescent particles may be subject to physical changes and/or reactions resulting from environmental conditions, including, for example, high heat and/or high humidity. Such reactions may result in a shift in the dominant wavelength of light output and/or the brightness of the light output. In some embodiments described herein, such luminescent particles may be stabilized such that variations in the wavelength and/or brightness due to environmental changes and/or reaction effects may be reduced. As described herein, some embodiments of a luminescent particle may be described as reacted and/or stabilized to indicate that one or more operations described herein have been performed thereon. Similarly, some embodiments of a luminescent particle may be described as unreacted and/or unstabilized to describe a particle upon which some operations described herein may not have been performed.

Techniques described herein with respect to the characterization of properties (e.g., x-ray powder diffraction) of a luminescent particle are generally well understood and can be conducted by persons of ordinary skill in this art without undue experimentation. Accordingly, such well-understood techniques of characterization have not been described in detail.

For example, reference is now made to FIG. 1, which is a flow diagram illustrating methods of providing a luminescent particle according to some embodiments of the present invention. Methods include providing a luminescent particle (block 102). Some embodiments provide that providing the luminescent particle may include forming the luminescent particle and/or acquiring the luminescent particle. In some embodiments, forming the luminescent particle may be performed at temperatures in a range between 1500 and 1850 degrees Centigrade. Some embodiments provide that forming the luminescent particle may be performed at temperatures in a range between about 1650 degrees Centigrade and about 1750 degrees Centigrade.

In some embodiments, the luminescent particle includes a phosphor formed from a host compound and at least one activator. Some embodiments provide that the host compound may be selected from a group including $Ca_2Si_5N_8$, $Sr_2Si_5N_8$, $Ba_2Si_5N_8$, $BaSi_7N_{10}$, $BaYSi_4N_7$, $Y_5(SiO_4)_3N$, $Y_4Si_2O_7N_2$, $YSiO_2N$, $Y_2Si_3O_3N_4$, $Ca_{1.5}Si_9Al_3N_{16}$, $Y_{0.5}Si_9Al_3O_{1.5}N_{14.5}$, $CaSiN_2$, $Y_2S_4N_6C$, and/or $Y_6Si_{11}N_{20}O$, among others. In some embodiments, an activator may be selected from a group including Ce, Eu, Sm, Yb, Gd and/or Tb, among others. Some embodiments provide that the host compound is $Ca_{1-x}Sr_xAlSiN_3$, where $0 \le x < 1$.

Methods according to some embodiments may include heating the luminescent particle for stabilization (block 104). Some embodiments provide that heating the luminescent particle includes reacting the luminescent particle in a heated liquid medium. As described herein, reacting may include chemical, physical, structural and/or surface reactions. Some embodiments provide that reacting the luminescent particle may alter and/or reduce a reactive characteristic of the outer surface of the luminescent particle. For example, in some embodiments, reducing the reactive characteristic may include forming a passivating layer on the outer surface of the luminescent particle.

In some embodiments, the passivating layer includes a greater oxygen content relative to an interior portion of the luminescent particle. For example, the reacting process may provide a protective oxide layer over the outer surface of the luminescent particle that limits and/or reduces subsequent reaction due to environmental conditions such as high temperature and/or high humidity. Some embodiments provide that reacting the luminescent particle includes removing at least one material from the outer surface of the luminescent particle. For example, in some embodiments, the passivating layer includes a decreased percent nitrogen relative to interior portions of a luminescent particle.

In some embodiments, reacting the luminescent particle in a heated liquid medium includes boiling the luminescent particle in an aqueous solution. In some embodiments, the aqueous solution may be water that is substantially absent other constituent components. For example, some embodiments provide that the luminescent particle may be boiled in de-ionized water. In this regard, a temperature of the aqueous solution may be maintained at the boiling point thereof for a specified duration. In some embodiments, the duration of the boiling operation may be about an hour. However, embodiments herein are not so limited. For example, the duration may be less than or more than an hour. In some embodiments, the duration may be in a range of about 1 minute to about 60 minutes, about 10 minutes to about 50 minutes, about 20 minutes to about 40 minutes, about 50 minutes to about 70 minutes, and/or about 40 minutes to about 80 minutes, among others.

In some embodiments, reacting the luminescent particle may include boiling the luminescent particle in an acid solution, including for, example, a nitric acid solution. Some embodiments provide that the acid solution may be limited in concentration to reduce a chemical attack on the luminescent particle. For example, some embodiments provide that the luminescent particle may be reacted by boiling in a nitric acid solution having a concentration of less than about 0.1 moles/liter.

As discussed above, some embodiments of the luminescent particle include a phosphor that may be configured to down-convert received photons in the blue and/or ultraviolet portions of the visible spectrum into photons in longer wavelength portions of the visible spectrum. For example, a luminescent particle may include a red nitride that is a phosphor composition that absorbs in the blue portion of the visible spectrum and emits in the red portion of the visible spectrum.

Figure 2A:
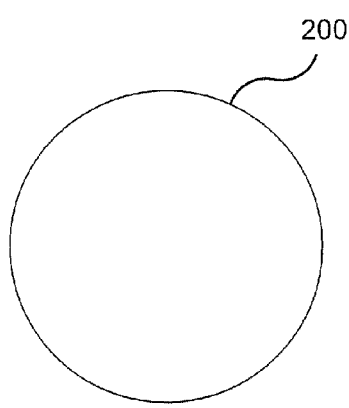
FIGS. 2A and 2B are cross-sectional views of a luminescent particle and a stabilized luminescent particle, respectively, according to some embodiments of the present invention.
Figure 2B:
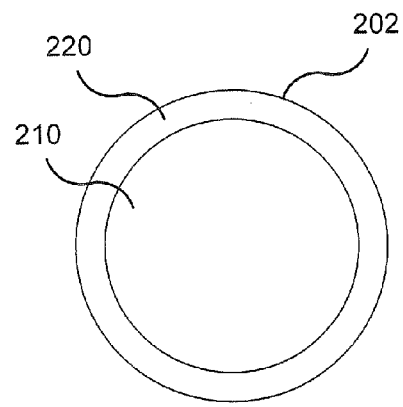

Brief reference is made to FIGS. 2A and 2B, which are cross-sectional views of a luminescent particle and a stabilized luminescent particle, respectively, according to some embodiments of the present invention. Referring to FIG. 2A, the luminescent particle 200 may include a luminescent compound throughout the surface and interior portion of the particle. Referring to FIG. 2B, a stabilized luminescent particle 202 may include an interior portion 210 that includes the luminescent compound that is substantially the same as the luminescent particle 200. In some embodiments, the luminescent compound may react with atmospherically present materials and/or conditions. For example, the luminescent compound may react with atmospherically present water vapor under, for example, high humidity and/or high temperature conditions. Some embodiments provide that the reaction may produce one or more resultant gases. For example, in some embodiments, a resultant gas may include $NH_3$.

Some embodiments provide that the stabilized luminescent particle 202 includes a passivating region 220 on the outer surface of the stabilized luminescent particle 202. In some embodiments, the passivating region 220 may be operable to inhibit a reaction between a luminescent compound and atmospherically present components and/or under high humidity and/or high temperature conditions. Some embodiments provide that the passivating region 220 includes a passivating layer.

In some embodiments, the passivating region 220 includes an oxide that may be formed during the exposure of a luminescent particle to a liquid medium that is heated to a threshold temperature. Some embodiments provide that the passivating region 220 includes a greater percentage of oxygen than the interior portion of the luminescent particle. In some embodiments, the passivating region 220 includes a reduced percentage of nitrogen than the interior portion of a stabilized luminescent particle. In this manner, nitrogen that may otherwise react in, for example, high humidity and/or high temperature environments, may be less available for such reaction.

Some embodiments provide that the heated liquid medium to which the luminescent particle is exposed includes an aqueous solution. In some embodiments, the threshold temperature includes the boiling point of the aqueous solution. Some embodiments provide that the liquid medium is water and the threshold temperature is the boiling point of water. Some non-limiting embodiments provide that the luminescent particle is exposed to the heated liquid medium for about an hour. In some embodiments, the thickness of the passivating region 220 may be regulated by adjusting the duration of the exposure to the heated liquid medium.

Some embodiments provide that the liquid medium includes an acid solution. In some embodiments, the acid solution may include nitric acid. A concentration of acid may include a concentration sufficiently dilute to avoid attacking the luminescent particle. For example, some embodiments may use a nitric acid solution having a concentration of less than about 0.1 moles/liter.

In some embodiments, the passivating region 220 includes a reduced nitrogen layer that is formed during exposure of a luminescent compound particle to the liquid medium that is heated to a threshold temperature. Some embodiments provide that the reduced nitrogen layer results from the transition of a portion of surface material from the luminescent particle via the liquid medium.

Some embodiments provide that the luminescent compound includes a phosphor formed from a host compound and at least one activator. Some embodiments provide that the host compound may be elected from a group including $Ca_2Si_5N_8$, $Sr_2Si_5N_8$, $Ba_2Si_5N_8$, $BaSi_7N_{10}$, $BaYSi_4N_7$, $Y_5(SiO_4)_3N$, $Y_4Si_2O_7N_2$, $YSiO_2N$, $Y_2Si_3O_3N_4$, $Ca_{1.5}Si_9Al_3N_{16}$, $Y_{0.5}Si_9Al_3O_{1.5}N_{14.5}$, $CaSiN_2$, $Y_2Si_4N_6C$, and/or $Y_6Si_{11}N_{20}O$, among others. In some embodiments, an activator may be elected from a group including Ce, Eu, Sm, Yb, Gd and/or Tb, among others. Some embodiments provide that the host compound is $Ca_{1-x}Sr_xAlSiN_3$, where $0 \leq x < 1$.

According to embodiments described herein, the photon down converting performance of the stabilized luminescent particle may be substantially preserved relative to the luminescent compound. For example, experimental data illustrates that the passivating region 220 only slightly reduced the brightness of the emitted light and resulted in little if any shift on the color of the emitted light. In some embodiments, the luminescent particle may include a partially oxidized surface prior to the reaction. Some embodiments provide that this partial oxidation may be a signature of a preparation method used to form the luminescent particle. For example, in some embodiments, a luminescent particle including $Ca_{1-x-y}Sr_x Eu_y AlSiN_3$, where $0 \leq x < 1$ and $0 < y < 1$, may include such a signature.

Some embodiments include a luminescent particle that includes a luminescent compound that reacts with a first component and an outer surface that includes a higher concentration of the first component. In some embodiments, the presence of the higher concentration of the first component in the outer surface may provide a reduced reactive characteristic of the luminescent particle relative to the first component.

Figure 3:
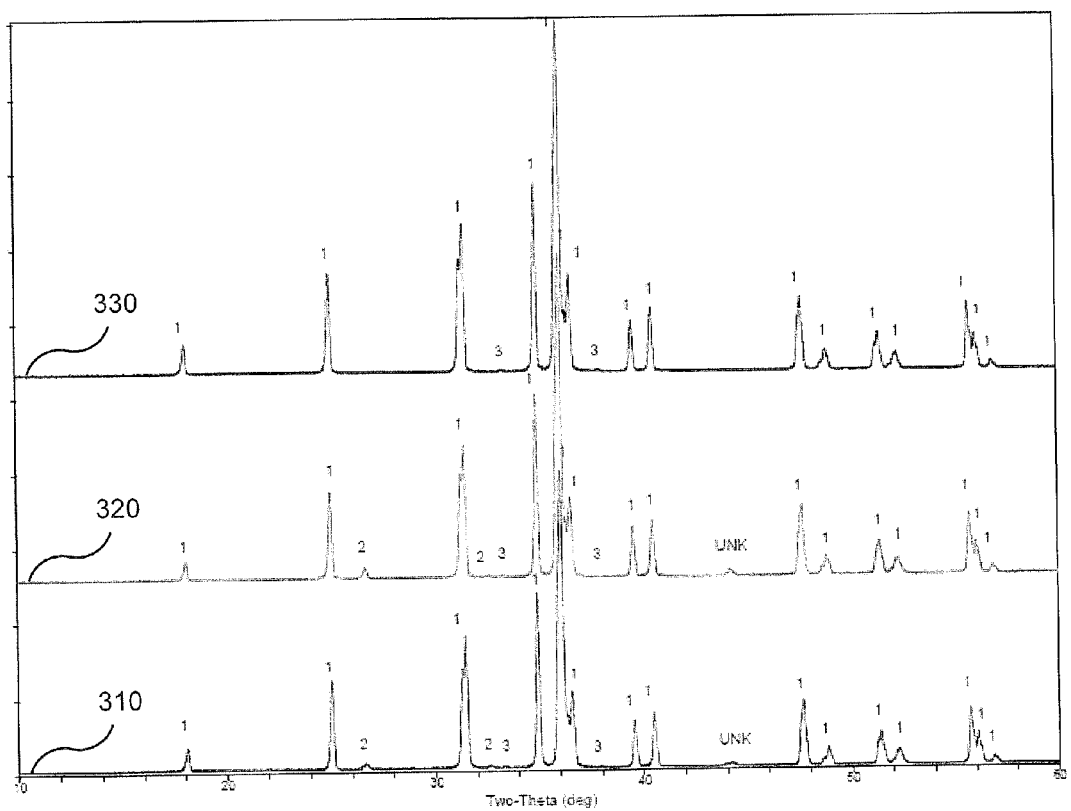
FIG. 3 is a graph comparing x-ray powder diffraction data of a luminescent particle, a luminescent particle stabilized using $H_2O$ and a luminescent particle stabilized using an acid solution according to some embodiments of the present invention.

Reference is now made to FIG. 3, which is a graph comparing x-ray powder diffraction data of a luminescent particle sample, a luminescent particle sample stabilized using $H_2O$ and a luminescent particle sample stabilized using an acid solution according to some embodiments of the present invention. The powder diffraction was carried out in a conventional manner using a sample of the luminescent compound $Ca_{1-x-y}Sr_x Eu_y AlSiN_3$, where $0 \leq x < 1$ and $0 < y < 1$, and the results thereof should be generally well understood by one of ordinary skill in this art.

The numeral 1's are provided to identify the diffraction peaks generated by the luminescent particles (phosphors in this case), the numeral 2's are provided to identify the diffraction peaks corresponding to $Si_2Al_4O_4N_4$, the numeral 3's correspond to AlN peaks, and the UNK peaks identify an unknown (to date) material.

The x-ray diffraction data includes a luminescent particle plot 310, a luminescent particle stabilized by boiling water plot 320, and a luminescent particle stabilized by a boiling nitric acid solution plot 330. The y-axis corresponds to intensity, but does not include values as this graph is merely for comparative purposes among the different particle types. Further, note that the boiling water plot 320 and the luminescent particle plot 310 include substantially the same diffraction pattern. In contrast, the boiling acid plot 330 differs from the luminescent particle plot 310 and the boiling water plot 320 as the peaks corresponding to the unknown material UNK appear to be dissolved away by the boiling acid operation.

Accordingly, other than the change regarding the unknown material, the diffraction plots of the un-stabilized and the stabilized particles are substantially the same.

Figure 4:
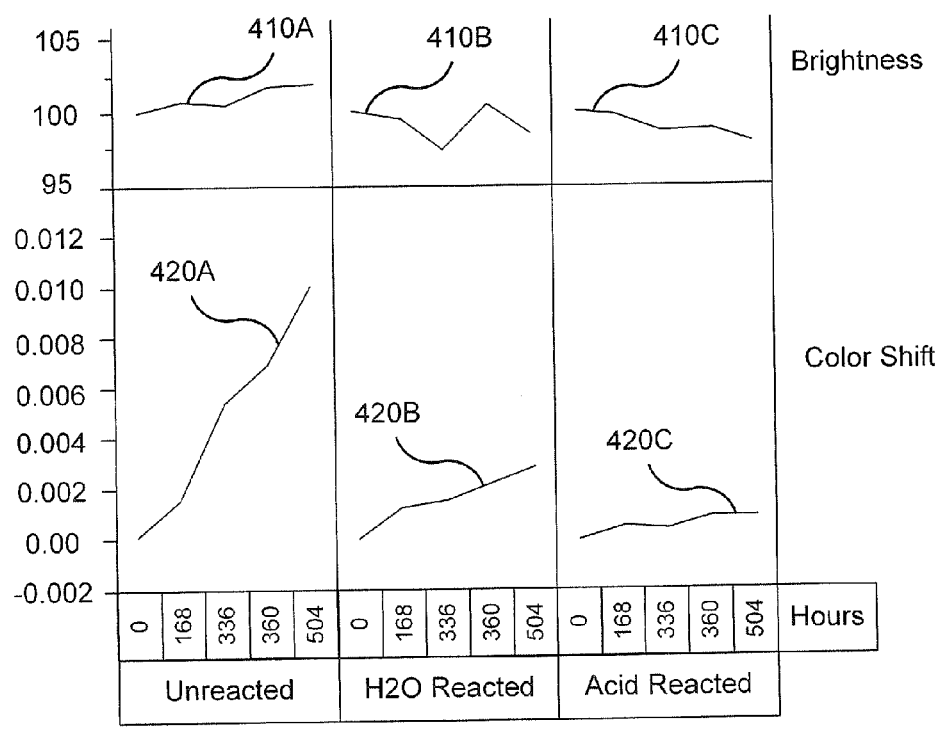
FIG. 4 is a graph comparing color shift and relative brightness reliability of a luminescent particle, a luminescent particle stabilized using $H_2O$ and a luminescent particle stabilized using an acid solution according to some embodiments of the present invention.

Reference is made to FIG. 4, which is a graph comparing relative brightness and color shift reliability of a luminescent particle, a luminescent particle stabilized using $H_2O$ and a luminescent particle stabilized using an acid solution according to some embodiments of the present invention. The top portion of FIG. 4 includes experimental data representing the variability of brightness for each sample compared to an initial value corresponding to time=0 hours for each sample. Specifically, the data corresponds to $Ca_{1-x-y}Sr_xEu_yAlSiN_3$ luminescent particles, where $0 \leq x < 1$ and $0 < y < 1$, including an unreacted luminescent particle 410A, a stabilized luminescent particle reacted using boiling water 410B and a stabilized luminescent particle reacted using a 0.1M nitric acid solution 410C. Although described generally in terms of brightness, the measurement may correspond to the luminous flux percent ratio that is measured at specific designated time intervals. For example, luminous flux measurements were taken at 0, 168, 336, 360 and 504 hours for each of the luminescent particle sample types in a high humidity and high temperature environment.

Note that the unreacted luminescent particle plot 410A illustrates that the brightness remained relatively consistent for the duration of the test indicating a slight trend towards improved brightness as a function of time. Both of the stabilized luminescent particle plots 410B, 410C represent a slight decline in brightness as a function of time, but were relatively stable.

The bottom portion of FIG. 4 includes color shift reliability data corresponding to the same sample types and durations as discussed above regarding the brightness data. The color shift data is expressed as a color shift of samples of an unreacted luminescent particle 420A, a stabilized luminescent particle reacted using boiling water 420B and a stabilized luminescent particle reacted using a 0.1M nitric acid solution 420C. Specifically, the color shift is expressed in terms of uv shift, where u and v may represent chrominance components in a YUV color space.

Regarding the relative performance of the samples, note that the unreacted luminescent particle plot 420A demonstrates a significant shift in color over the duration of the test. In contrast, the plot of stabilized luminescent particle reacted using the boiling water 420B illustrates a significantly reduced shift in color relative to the unreacted luminescent particle. Additionally, the plot of stabilized luminescent particle reacted using the acid solution 420C also illustrates a significantly reduced shift in color relative to the unreacted luminescent particle. In this regard, both of the stabilized luminescent particle samples provided significantly better color reliability than the unreacted luminescent particle.

Figure 5:
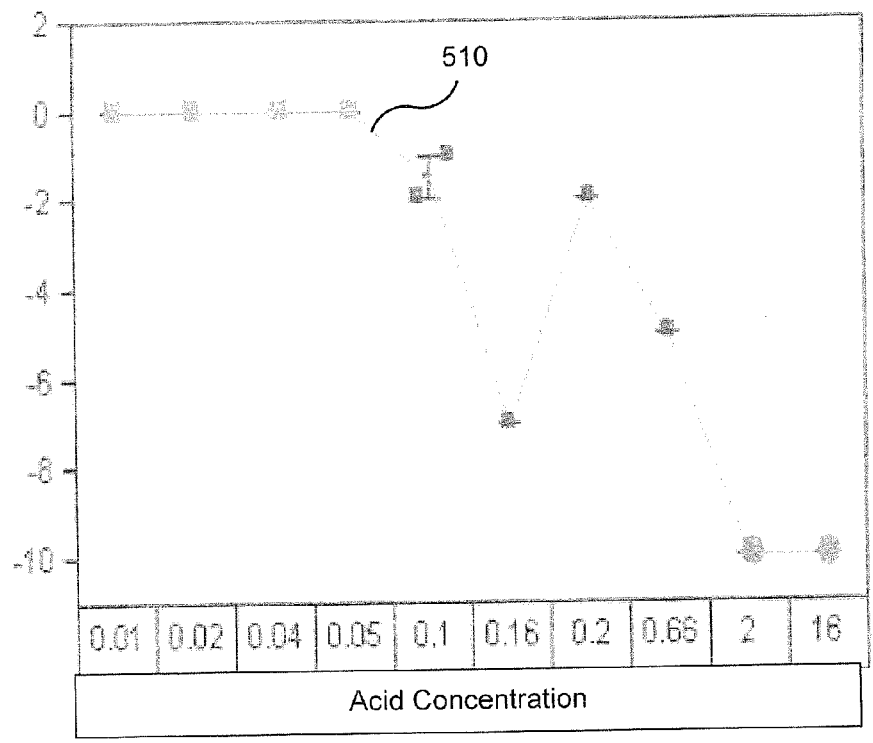
FIG. 5 is a graph illustrating relative brightness as a function of acid concentration in a liquid medium according to some embodiments of the present invention.

Brief reference is now made to FIG. 5, which is a graph illustrating relative brightness as a function of acid concentration in a liquid medium according to some embodiments of the present invention. Various concentrations of acid were analyzed to determine working ranges for using the boiling acid solution to react the luminescent particles. As illustrated, concentrations of nitric acid up to about 0.1 moles/liter did not adversely affect the brightness of the luminescent particles. However, once the concentration exceeded about 0.1 moles/liter, the brightness was reduced, likely as a result of the acid attacking the luminescent particles.

Figure 6:
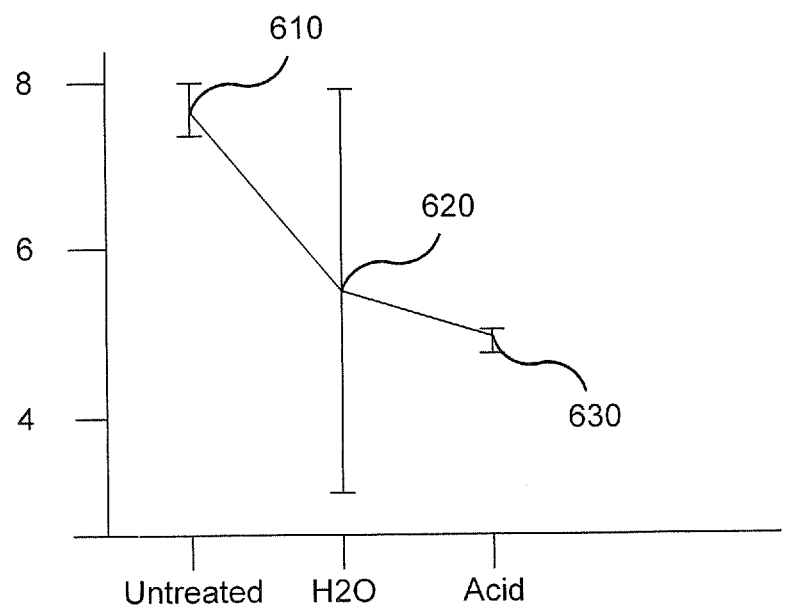
FIG. 6 is a graph comparing brightness variability of a luminescent particle, a luminescent particle stabilized using $H_2O$, and a luminescent particle stabilized using a 0.1M nitric acid solution according to some embodiments of the present invention.

Brief reference is now made to FIG. 6, which is a graph comparing brightness variability of a luminescent particle, a luminescent particle stabilized using $H_2O$, and a luminescent particle stabilized using a 0.1M nitric acid solution according to some embodiments of the present invention. The exemplary brightness variability data as illustrated corresponds to a $Ca_{1-x}Sr_xEu_yAlSiN_3$ compound, where $0 \leq x < 1$ and $0 < y < 1$. Note that the ranges for each un-stabilized, the $H_2O$ stabilized and the acid stabilized samples correspond to individual data variability as tested. For comparison purposes, the average brightness values are identified for each of the sample sets. Note that although each of the $H_2O$ stabilized 620 and the acid stabilized 630 particle samples do have reduced average brightness values relative to the un-stabilized (untreated) 610 particle samples, the brightness is still within an acceptable range.

Figure 7:
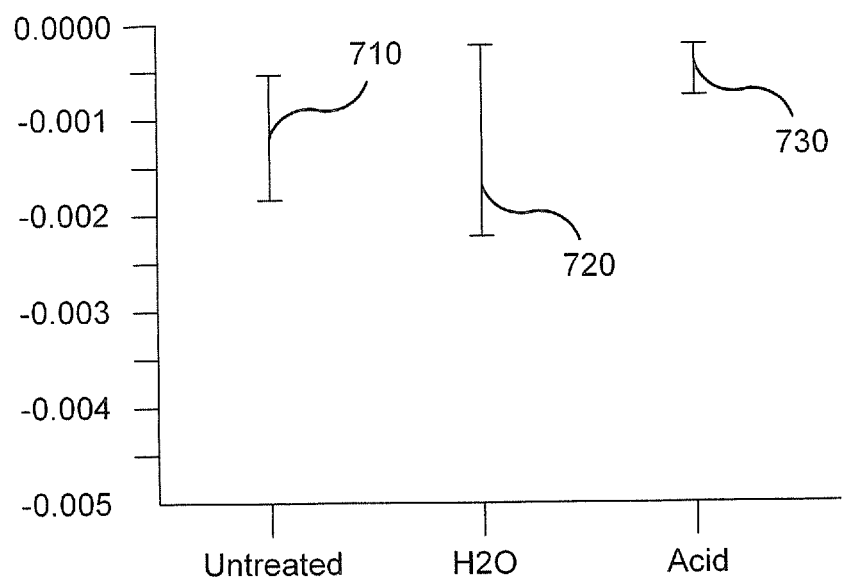
FIG. 7 is a graph comparing color variability of a luminescent particle, a luminescent particle stabilized using $H_2O$, and a luminescent particle stabilized using a 0.1M nitric acid solution according to some embodiments of the present invention.

Brief reference is now made to FIG. 7, which is a graph comparing color variability of a luminescent particle, a luminescent particle stabilized using $H_2O$, and a luminescent particle stabilized using a 0.1M nitric acid solution according to some embodiments of the present invention. The exemplary color variability data as illustrated corresponds to a $Ca_{1-x}Sr_xEu_yAlSiN_3$ compound. The color variability is illustrated as a range of color value shift for the different samples. For example, the ranges of color value variability of the stabilized luminescent particles 720 and 730 illustrate substantially no color change relative to the color value variability range of the unreacted luminescent particle 710. Accordingly, there is almost no change in color as a result of the H2O and acid stabilization.

Figure 8:
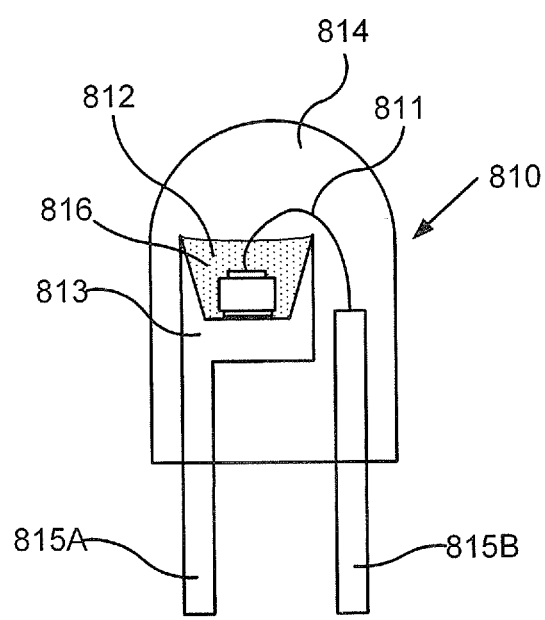
FIG. 8 is a side view of a light emitting device that includes a stabilized luminescent particle according to some embodiments of the present invention.

Reference is now made to FIG. 8, which is a side view of a light emitting device 810 that includes a stabilized luminescent particle according to some embodiments of the present invention. In some embodiments, a light emitting device 810 may include a light emitting source. For example, a light emitting source may include an LED chip 812 that may be mounted on a reflective cup 813 by means of a solder bond or conductive epoxy. One or more wirebonds 811 may connect the ohmic contacts of the LED chip 812 to leads 815A and/or 815B, which may be attached to and/or integral with the reflective cup 813.

The light emitting device may include a stabilized luminescent particle as described herein. In some embodiments, stabilized luminescent particles may be included in an encapsulant material 816 that may be used to fill the reflective cup 813. For example, in some embodiments the encapsulant material 816 may be a silicone encapsulant. Some embodiments provide that a light emitting device as described herein may include electrical leads, contacts or traces for electrically connecting the device to an external circuit. In some embodiments, the light emitting device may then be encapsulated in a clear protective resin 814. Some embodiments provide that the clear protective resin 814 may be molded in the shape of a lens to collimate the light emitted from the LED chip 812.

In some embodiments, the light emitting source may be a LED chip 812 and the stabilized luminescent particles may be directly coated using any of a variety of phosphor coating techniques. Some embodiments provide that the stabilized luminescent particles may be applied to the LED chip 812 using, for example, electrophoretic deposition, among others.

In some embodiments, the light emitting source emits radiation with a maximum emission at a wavelength in a range of about 380 to about 470 nm and the stabilized luminescent particle absorbs at least some of the light emitted from the light emitting source and emits light having a maximum emission at a wavelength in a range of about 500 to about 700 nm. Such embodiments, however, are merely exemplary and thus light sources operating at different combinations of dominant wavelengths are within the scope disclosed herein.

The light emitting source may include a light emitting diode, a laser diode and/or other semiconductor device that includes one or more semiconductor layers, which may include silicon, silicon carbide, gallium nitride and/or other semiconductor materials, a substrate which may include sapphire, silicon, silicon carbide and/or other microelectronic substrates, and one or more contact layers, which may include metal and/or other conductive layers. The design and fabrication of semiconductor light emitting devices are well known to those having skill in the art and need not be described in detail herein.

For example, light emitting devices according to some embodiments of the present invention may include structures such as the gallium nitride-based LED and/or laser structures fabricated on a silicon carbide substrate, such as those devices manufactured and sold by Cree, Inc. of Durham, N.C. The present invention may be suitable for use with LED and/or laser structures that provide active regions such as described in U.S. Pat. Nos. 6,201,262; 6,187,606; 6,120,600; 5,912,477; 5,739,554; 5,631,190; 5,604,135; 5,523,589; 5,416,342; 5,393,993; 5,338,944; 5,210,051; 5,027,168; 5,027,168; 4,966,862 and/or 4,918,497, the disclosures of which are incorporated herein by reference in their entirety as if set forth fully herein. Other suitable LED and/or laser structures are described in published U.S. Patent Application Publication No. US 2003/0006418 A1 entitled Group III Nitride Based Light Emitting Diode Structures With a Quantum Well and Superlattice, Group III Nitride Based Quantum Well Structures and Group III Nitride Based Superlattice Structures, published Jan. 9, 2003, as well as published U.S. Patent Application Publication No. US 2002/0123164 A1 entitled Light Emitting Diodes Including Modifications for Light Extraction and Manufacturing Methods Therefor, the disclosures of which are hereby incorporated herein by reference in their entirety as if set forth fully herein. Furthermore, phosphor coated LEDs, such as those described in U.S. application Ser. No. 10/659,241, now U.S. Pat. No. 6,853,010, entitled Phosphor-Coated Light Emitting Diodes Including Tapered Sidewalls and Fabrication Methods Therefor, filed Sep. 9, 2003, the disclosure of which is incorporated by reference herein as if set forth fully, may also be suitable for use in some embodiments of the present invention. The LEDs and/or lasers may be configured to operate such that light emission occurs through the substrate. In such embodiments, the substrate may be patterned so as to enhance light output of the devices as is described, for example, in the above-cited U.S. Patent Application Publication No. US 2002/0123164 A1. Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Figure 9:
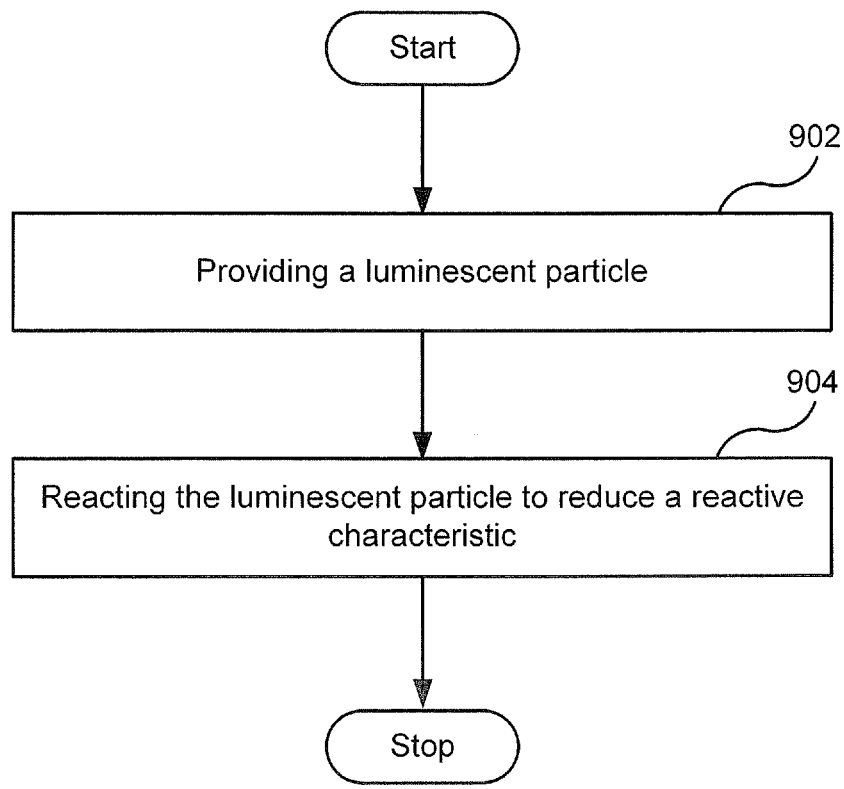
FIG. 9 a flow diagram illustrating methods of providing a luminescent particle according to some embodiments of the present invention.

Brief reference is now made to FIG. 9, which is a flow diagram illustrating methods of providing a luminescent particle according to some embodiments of the present invention. Methods include providing a luminescent particle (block 902). In some embodiments, the luminescent particle may react with a first compound. Some embodiments provide that providing the luminescent particle may include forming the luminescent particle and/or acquiring the luminescent particle. In some embodiments, forming the luminescent particle may be performed at temperatures in a range between 1500 and 1850 degrees Centigrade. Some embodiments provide that forming the luminescent particle may be performed at temperatures in a range between about 1650 degrees Centigrade and about 1750 degrees Centigrade.

Some embodiments provide that the luminescent particle may include a phosphor formed from a host compound and at least one activator. Various embodiments of the host compound and/or activator are discussed above and thus are not described redundantly regarding FIG. 9.

Methods according to some embodiments may include reacting the luminescent particle to reduce a reactive characteristic (block 904). Some embodiments provide that the outer surface includes a passivating region that includes a reduced reactive characteristic relative to an interior portion of the luminescent particle.

In some embodiments, the reactive characteristic may be reduced on an outer surface of the luminescent particle by reacting the luminescent particle in a medium. Some embodiments provide that reacting the luminescent particle in a medium to reduce a reactive characteristic of an outer surface of the luminescent particle forming the passivating region on the outer surface of the luminescent particle. In some embodiments, the passivating region includes a greater percentage of the first component than an interior portion of the luminescent particle.

Some embodiments provide that reacting the luminescent particle in a medium includes reducing a concentration of at least one material from the outer surface of the luminescent particle. In some embodiments, the medium includes an aqueous solution and reacting the luminescent particle includes heating the liquid aqueous solution. Some embodiments provide that the aqueous solution is heated to maintain a temperature substantially at a boiling point of the aqueous solution. For example, some embodiments provide that the luminescent particle may be boiled in de-ionized water. In this regard, a temperature of the aqueous solution may be maintained at the boiling point thereof for a specified duration.

In some embodiments, the passivating region includes a greater oxygen content relative to an interior portion of the luminescent particle. For example, the reacting process may provide a protective oxide layer over the outer surface of the luminescent particle that limits and/or reduces subsequent reaction due to environmental conditions such as high temperature and/or high humidity. Some embodiments provide that reacting the luminescent particle includes removing at least one material from the outer surface of the luminescent particle. For example, in some embodiments, the passivating region includes a decreased percent nitrogen relative to interior portions of a luminescent particle.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A luminescent particle comprising:
an interior portion comprising a luminescent compound comprising $Ca_{1-x-y}Sr_xEu_yAlSiN_3$, where $0 \leq x < 1$ and $0 < y < 1$; and
a passivating region proximate an outer surface of the interior portion and operable to inhibit reactions involving the luminescent compound,
wherein the passivating region comprises nitrogen, the nitrogen being present at a reduced percentage compared to the interior portion of the luminescent particle.

2. The luminescent particle of claim 1, wherein the passivating region comprises an oxide.

3. The luminescent particle of claim 1, wherein the passivating region comprises a greater percentage of oxygen than the interior portion of the luminescent particle.

4. The luminescent particle of claim 1 comprising a color shift of about 0.003 or less after 504 hours in a high humidity and high temperature environment.

5. The luminescent particle of claim 4 wherein the color shift is about 0.001 after 504 hours.

6. A light emitting device comprising:
the luminescent particle of claim 1; and
a light emitting source.

7. The light emitting device of claim 6, wherein the luminescent particle is dispersed within a silicone encapsulant.

8. The light emitting device of claim 7, wherein the light emitting source emits radiation with a maximum emission at a wavelength in a range of from about 380 to about 470 nm, and wherein the luminescent particle absorbs at least some of the light emitted from the light emitting source and emits light having a maximum emission at a wavelength in a range of from about 500 to about 700 nm.

9. A luminescent particle comprising:
an interior portion comprising a luminescent compound comprising $Ca_{1-x-y}Sr_xEu_yAlSiN_3$, where $0 \leq x<1$ and $0<y<1$; and
a $H_2O$-stabilized or an acid-stabilized passivating region proximate an outer surface of the interior portion and operable to inhibit reactions involving the luminescent compound.

10. The luminescent particle of claim 9, wherein the color shift is about 0.003 or less after 504 hours.

11. The luminescent particle of claim 9, wherein the passivating region comprises nitrogen, the nitrogen being present at a reduced percentage of nitrogen compared to the interior portion of the luminescent particle.

12. The luminescent particle of claim 11, wherein the passivating region comprises an oxide.

13. The luminescent particle of claim 9, wherein the passivating region is formed during exposure of the interior portion to a heated liquid medium comprising water.

14. The luminescent particle of claim 13, wherein a thickness of the passivating region is regulated by adjusting a time duration of the exposure of the luminescent particle to the heated liquid medium.

15. A method of preparing a luminescent particle, the method comprising:
providing a luminescent particle comprising: a host compound selected from the group including $Ca_{1-x}Sr_x AlSiN_3$, $Ca_2Si_5N_8$, $Sr_2Si_5N_8$, $Ba_2Si_5N_8$, $Ba_2Si_7N_{10}$, $BaYSi_4N_7$, $Y_5(SiO_4)_3N$, $Y_4Si_2O_7N_2$, $YSiO_2N$, $Y_2Si_3O_3N_4$, $Ca_{1.5}Si_9Al_3N_{16}$, $Y_{0.5}Si_9Al_3O_{1.5}N_{14.5}$, $CaSiN_2$, $Y_2Si_4N_6C$, and/or $Y_6Si_{11}N_{20}O$, wherein $0 \leq x<1$; and at least one activator comprising Ce, Eu, Sm, Yb, Gd and/or Tb;
exposing the luminescent particle to a heated liquid medium comprising water; and
forming a passivating region on an outer surface of the luminescent particle, wherein a thickness of the passivating region is regulated by adjusting a time duration of the exposure of the luminescent particle to the heated liquid medium.

16. The method of claim 15, wherein the heated liquid medium is heated to a boiling point thereof, and wherein the time duration of the exposure is from about 1 minute to about 60 minutes.

17. The method of claim 16, wherein the time duration of the exposure is from about 10 minutes to about 50 minutes.

18. The method of claim 15, wherein the heated liquid medium is heated to a boiling point thereof.

19. The method of claim 15, wherein the heated liquid medium further comprises nitric acid at a concentration of less than about 0.1 mole/liter.

20. The method of claim 15, wherein the luminescent particle comprises $Ca_{1-x-y}Sr_xEu_yAlSiN_3$, wherein $0<y<1$.

* * * * *